United States Patent
Gibb

(10) Patent No.: US 10,697,519 B2
(45) Date of Patent: Jun. 30, 2020

(54) SOLAR ARRAY POSITIONING ACTUATOR FOR SPACECRAFT

(71) Applicant: LOCKHEED MARTIN CORPORATION, Bethesda, MD (US)

(72) Inventor: John L. Gibb, Sunnyvale, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 170 days.

(21) Appl. No.: 15/957,860

(22) Filed: Apr. 19, 2018

(65) Prior Publication Data

US 2018/0306277 A1    Oct. 25, 2018

Related U.S. Application Data

(60) Provisional application No. 62/487,991, filed on Apr. 20, 2017.

(51) Int. Cl.
*F16H 1/32*       (2006.01)
*B64G 1/44*      (2006.01)
*H02K 7/116*    (2006.01)

(52) U.S. Cl.
CPC ............. *F16H 1/32* (2013.01); *B64G 1/44* (2013.01); *H02K 7/116* (2013.01); *F16H 2001/325* (2013.01)

(58) Field of Classification Search
CPC ....... F16H 1/32; F16H 2001/325; B64G 1/44; H02K 7/116
See application file for complete search history.

(56) References Cited

U.S. PATENT DOCUMENTS

| | | | |
|---|---|---|---|
| 2,313,132 A * | 3/1943 | Elliott | F16H 3/721 74/731.1 |
| 2,382,482 A * | 8/1945 | Henry | F16H 1/32 475/173 |
| 3,991,572 A | 11/1976 | Huebscher et al. | |
| 6,119,984 A | 9/2000 | Devine | |
| 6,126,115 A | 10/2000 | Carrier | |
| 6,311,930 B1 | 11/2001 | Hersh et al. | |
| 8,056,862 B1 | 11/2011 | Tomerlin | |

(Continued)

FOREIGN PATENT DOCUMENTS

WO    WO-2018065704 A1    4/2018

OTHER PUBLICATIONS

Lucy M., et al.: "Report on Alternative Devices Topyrotechnics on Spacecraft", AIAA/USU Conference on Small Satellites, Sep. 1, 2996, pp. 1-20.

*Primary Examiner* — Stacey A Fluhart
(74) *Attorney, Agent, or Firm* — Morgan, Lewis & Bockius, LLP

(57) ABSTRACT

An actuator for positioning a solar array to track the sun includes a motor and a single-stage cycloidal gearbox operatively coupled to the motor. The single-stage cycloidal gearbox includes a drive shaft rotationally coupled to the motor to rotate the drive shaft about a drive axis at a first input speed, an input gear coupled to and driven by the drive shaft, and an output gear configured to be engaged and driven by the input gear at a second output speed. The single-stage cycloidal gearbox is configured to reduce the first input speed to the second output speed within a single rotation of the drive shaft. The first speed is reduced to the second speed by a factor of at least 60 within the single rotation of the drive shaft.

20 Claims, 3 Drawing Sheets

(56) References Cited

U.S. PATENT DOCUMENTS

| | | | |
|---|---|---|---|
| 2005/0082038 A1 | 4/2005 | Korpan | |
| 2008/0305908 A1* | 12/2008 | Tamenaga | F16H 1/32 |
| | | | 475/162 |
| 2010/0107788 A1* | 5/2010 | Heichel | B06B 1/166 |
| | | | 74/61 |
| 2010/0215424 A1 | 8/2010 | Crookston | |
| 2018/0287455 A1* | 10/2018 | Uematsu | H02K 11/38 |

* cited by examiner

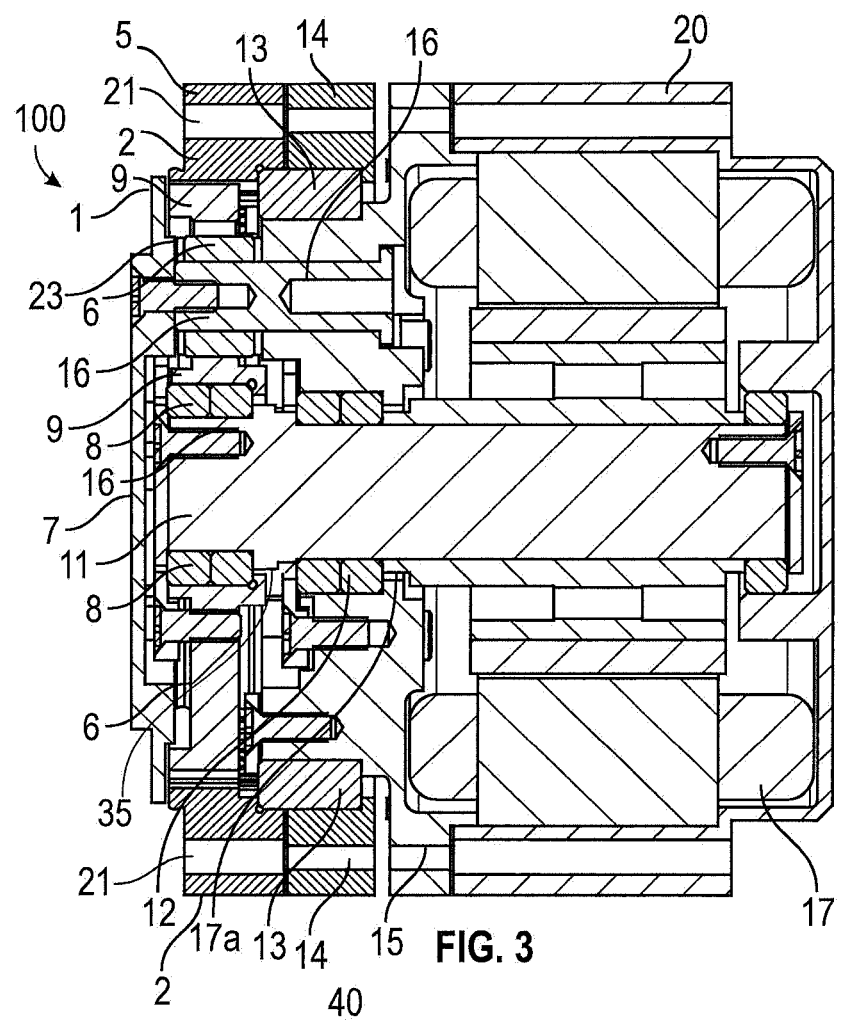
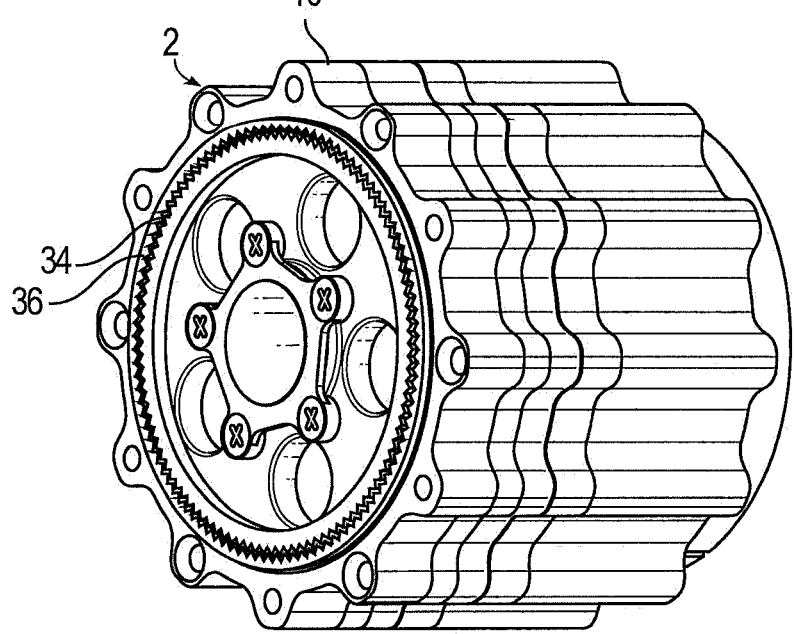
FIG. 4

SOLAR ARRAY POSITIONING ACTUATOR FOR SPACECRAFT

CROSS-REFERENCE TO RELATED APPLICATIONS

This application claims priority under 35 U.S.C. § 119 to Provisional Application No. 62/487,991 filed on Apr. 20, 2017, in the United States Patent and Trademark Office.

CROSS-REFERENCES TO RELATED APPLICATIONS

Not applicable.

STATEMENT REGARDING FEDERALLY SPONSORED RESEARCH OR DEVELOPMENT

Not applicable.

TECHNICAL FIELD

The disclosure including accompanying figure(s) ("disclosure") relates in general to solar arrays, and in particular to, for example, without limitation, value-engineered high-efficiency actuators for positioning a solar array to face the sun.

BACKGROUND

The description provided in the background section, including without limitation, any problems, features, solutions or information, should not be assumed to be prior art merely because it is mentioned in or associated with the background section. The background section may include information that describes one or more aspects of the subject technology.

A large number spacecraft such as satellites use solar energy to satisfy at least a portion of their power requirements during missions. The solar energy is captured via solar arrays that are made of solar cells, and are provided in different shapes, sizes, and arrangements. Currently, one of the primary cost drivers for space solar arrays is the relatively complex and costly actuator systems and devices used to position the solar arrays to face the sun.

Conventional mechanical systems using actuators generally have complex structures which tend to come with high production costs due to the increased number of parts. Furthermore, due to these complex structures and mechanisms, conventional positioning actuators tend to be less efficient in nature due to their structural configurations. Additionally, conventional actuators such as harmonic drive actuators tend to be capable only of a narrow range of reduction ranges due to the specialized nature of their parts. This keeps the conventional actuator systems from being versatile. Furthermore, the customized nature of these parts requires specialized equipment that is expensive to build, maintain, and operate.

Therefore, there is a need for high efficiency, low cost, positioning actuators for solar arrays having a simplified structure, and which do not require customization of parts to achieve high reduction ratios.

SUMMARY

In one or more implementations, an actuator for positioning a solar array to track the sun is provided that includes a motor and a single-stage cycloidal gearbox operatively coupled to the motor. The single-stage cycloidal gearbox includes a drive shaft rotationally coupled to the motor which is configured to rotate the drive shaft about a drive axis at a first input speed, an input gear coupled to and driven by the drive shaft, and an output gear configured to be engaged and driven by the input gear at a second output speed. The single-stage cycloidal gearbox is configured to reduce the first input speed to the second output speed within a single rotation of the drive shaft.

In one or more implementations, a single-stage cycloidal gearbox is provided that includes a drive shaft, an input gear, and an output gear positioned radially exterior to the input gear. The drive shaft has a drive axis and an eccentric cam surface at first end thereof. The drive shaft is rotationally coupled at a second end thereof to a motor configured to rotate the drive shaft about the drive axis at a first input speed. The input gear is coupled to the eccentric cam surface and configured to be orbitally translated about the drive axis by the eccentric cam surface. The output gear is configured to be engaged with and driven by the orbitally translated input gear at a second output speed. Within a single rotation of the drive shaft, the first speed is reduced to the second by a factor of at least 60.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 3 illustrates a cross-sectional view of the solar array positioning actuator of FIG. 1, according to some embodiments of the present disclosure.

FIG. 4 illustrates a perspective view of the solar array positioning actuator of FIG. 1 as assembled, according to some embodiments of the present disclosure.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In accordance with various embodiments of the present disclosure, a gearbox for a solar array positioning actuator is provided. More specifically, as shall be described herein, the solar array positioning actuator includes a high-efficiency, single-stage cycloidal gearbox which provides several advantages over conventional solar array positioning actuators. For example, the single-stage cycloidal gearbox as described herein is advantageous in that it employs a simple configuration not requiring customized gears or customized equipment to manufacture. The single-stage cycloidal gearbox employs a single-stage gearing (one input gear and one output gear), and is thereby reduced in complexity and cost as compared to conventional solar array positioning actuators which either require multiple gear stages, and/or customized parts.

Further, the actuator having the single-stage cycloidal gearbox as described herein is able to achieve a gear reduction rate in the magnitude of 1:60 using only a single stage gearing, and is thus highly efficient. For example, if input gear 9 has 120 teeth, and output gear 2 has 122 teeth, the effective ratio of the gearbox is 120/(122−120)=60:1. In contrast, conventional actuators employ reduction spur geartrains which typically require two or more stages of gears to achieve gear reductions of the magnitudes described herein.

Figure 1:
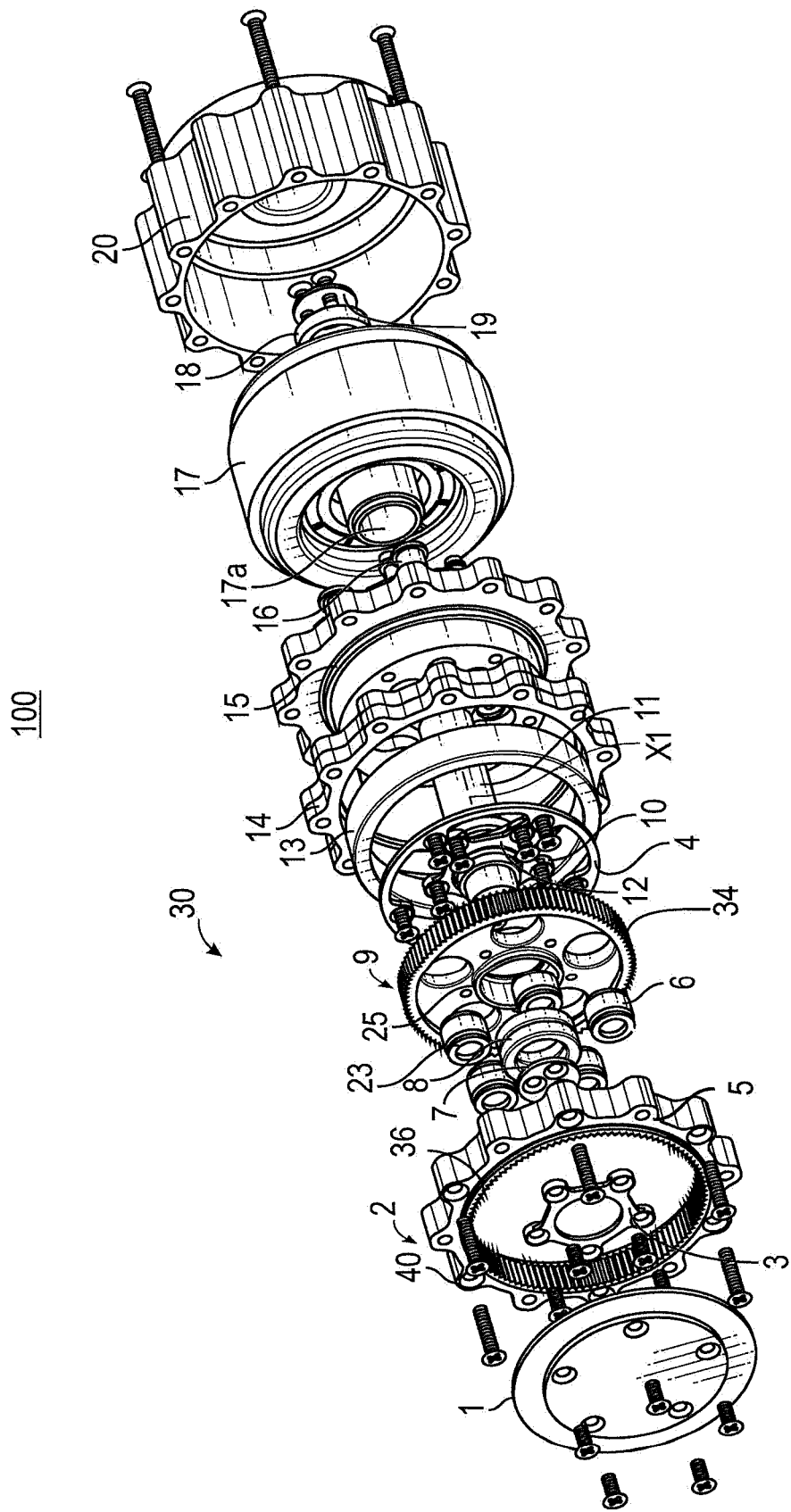
FIG. 1 is a first exploded view of a solar array positioning actuator, according to some embodiments of the present disclosure.
Figure 2:
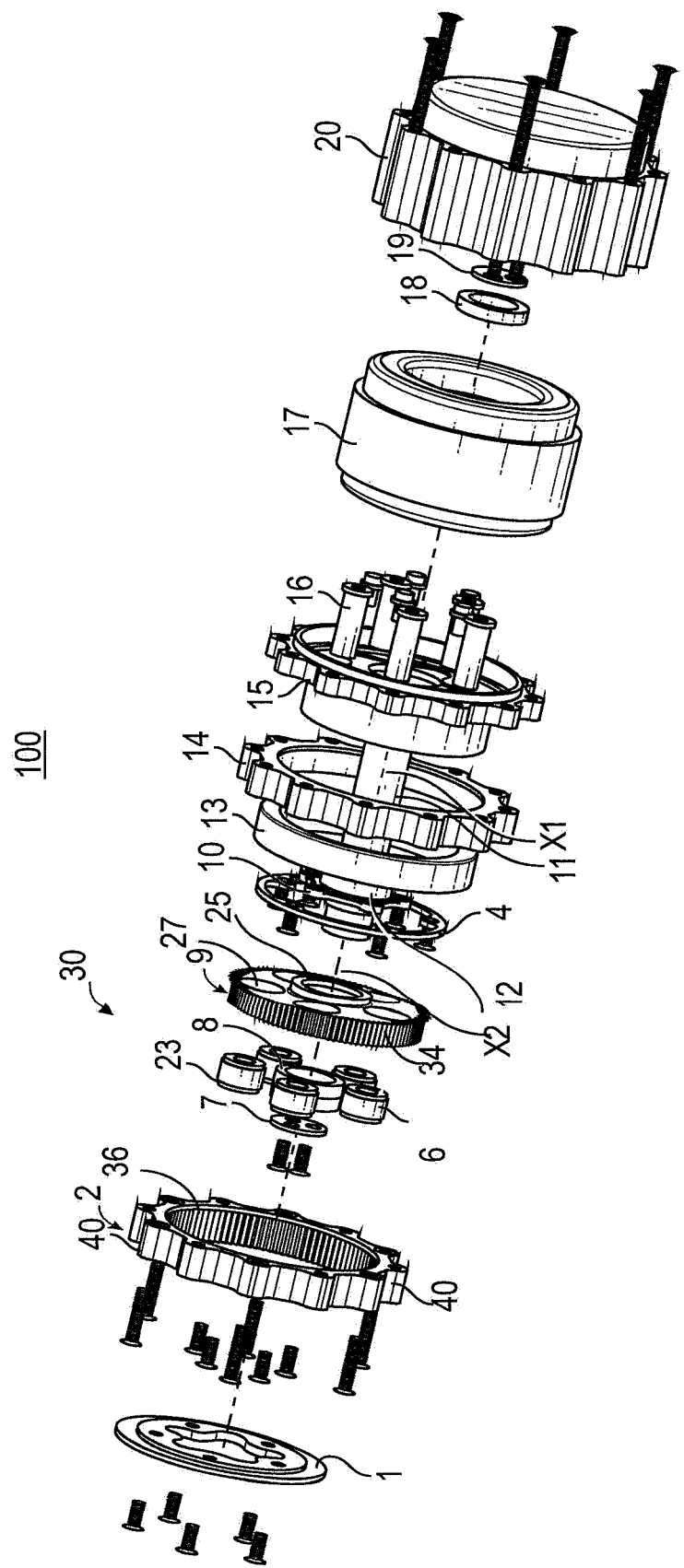
FIG. 2 is a second exploded view of the solar array positioning actuator of FIG. 1, according to some embodiments of the present disclosure, according to some embodiments of the present disclosure.

FIG. 1 is a first exploded view of a solar array positioning actuator, according to some embodiments of the present disclosure. FIG. 2 is a second exploded view of the solar array positioning actuator of FIG. 1, according to some embodiments of the present disclosure, according to some embodiments of the present disclosure. FIG. 3 illustrates a cross-sectional view of the solar array positioning actuator of FIG. 1, according to some embodiments of the present disclosure. FIG. 4 illustrates a perspective view of the solar array positioning actuator of FIG. 1, according to some embodiments of the present disclosure.

As illustrated in FIGS. 1-4, the actuator 100 includes a drive motor 17, and a single-stage cycloidal gearbox 30 including a drive shaft 11. The drive motor 17 is configured to rotate the drive shaft 11 about a rotational axis X1 of the drive shaft. More specifically, in some embodiments, the drive shaft 11 is rotationally coupled to a rotor 17a of the motor 17. The rotor 17a rotates the drive shaft 11 about the rotational axis X1 at a first input speed. The single-stage cycloidal gearbox 30 is operatively coupled to the drive shaft 11 to reduce the first input speed to a second output speed for rotating the solar array. As depicted, the single-stage cycloidal gearbox further includes an input gear 9, and an output gear 2. The input gear 9 is coupled to and driven by the drive shaft 11, and disposed radially interior to the output gear 2. When driven by the drive shaft 11, the input gear 9 is configured to translate and engage the output gear 2 so as to rotate the output gear 2 at the second output speed. Since the single-stage cycloidal gearbox 30 includes only one stage of gears (i.e., one input and one output gear), and since the speed at which the output gear rotates is less than that at which the drive shaft rotates, the single-stage cycloidal gearbox 30 operates to perform reduction of the speed from the first speed to the second speed in a single rotation of the drive shaft 11. In some embodiments, the first speed is reduced to the second speed by a factor of at least 60 (i.e., 60 times less in magnitude) in a single rotation of the drive shaft 11. That is, in a single rotation or revolution of the drive shaft 11, the first speed is reduced 60 times in magnitude, so that the second speed is 60 times smaller or less than the first speed.

In accordance with various embodiments, the input gear 9 has a center aperture 25 having a central axis X2 and a plurality of drive apertures 27 circumferentially disposed about the center aperture 25. An outer circumference of the input gear 9 may include gearing features 34. As depicted, the input gear 9 includes teeth 34. In some embodiments, however, the input gear 9 may include other types of gearing features, such as pins, and may include fewer or more gearing features in order to achieve a different gear reduction ratio. In the depicted embodiments, the teeth 34 of the input gear 9 are disposed peripherally about a radial exterior of the input gear 9. The output gear 2 may in turn include a plurality of internal teeth 36 disposed about a radial interior of thereof. When the eccentric cam surface 35 (illustrated in FIG. 3) engages the input gear 9, the input gear 9 is translated orbitally within the output gear 2. As the input gear 9 translates orbitally within the output gear 2, the external teeth 34 of the input gear 9 are engaged into and out of mesh with the internal teeth 36 of the output gear 2. The in-and-out meshing of the teeth 34 and 36 during orbital translation of the input gear 9 produces a corresponding rotational motion of the output gear 2 and the external teeth 40 at the second reduced speed.

In the depicted embodiments, the drive apertures 27 have a diameter greater than the outer diameter of the output rollers 6 such that when the input gear 9 is translated, the drive apertures 27 may orbit about the stationary output rollers 6. As such, the input gear 9 is constrained to orbital motion about axis X1 as opposed to rotational motion about input gear's own axis of rotation X1. As depicted, 5 output rollers 6 are provided corresponding with the 5 drive apertures 27. However, the various embodiments of the present disclosure are not limited thereto, and any desired number of output rollers 6 may be provided. Similarly, in some embodiments, the input gear 9 may include fewer or more drive apertures 27, e.g., 4 drive apertures, 5 drive apertures, 7 drive apertures, etc., preferably corresponding to the number of output rollers 6. The roller shafts 16 thus function to constrain rotation of the input gear 9 about the central axis X2 of the central aperture.

As depicted, the plurality of output rollers 6 extend axially (i.e., parallel to the axis X2) within the input gear 9. The plurality of output rollers 6 are each mounted within a corresponding aperture of the drive apertures 27. In order to be mounted within the drive apertures 27, the output rollers 6 each have a diameter smaller than a diameter of the corresponding apertures 27 into which they are mounted. In some embodiments, a plurality of roller shafts 16 is mounted within a housing 15 of the single-stage cycloidal gearbox 30. The roller shafts 16 each have an outer diameter smaller than the inner diameter of each of the output rollers 6. The output rollers are mounted on the roller shafts 16 and fixedly positioned within a corresponding aperture of the drive apertures 27. The above configuration using rolling element bearing, i.e., output rollers 6, as well as stress washers 23 coupled to the rolling element bearings provides for the single-stage cycloidal gearbox 30 to function efficiently as the rolling elements reduce friction, and the washers 23 distribute loads and provide spring tension as necessary.

Additionally, as a result of the reduced or minimized friction forces, the single-stage cycloidal gearbox 30 described herein is back-driveable.

In the depicted embodiments, the drive shaft 11 includes an eccentric cam surface 35 (illustrated in FIG. 3) mounted within the center aperture 25 of the input gear 9. As the drive shaft 11 rotates, the eccentric cam surface 35 engages the center aperture 25. As depicted in FIG. 3, the output rollers 6 serve to constrain rotation of the input gear 9 about the axis X2 when engaged with and translated orbitally by the driving shaft 11. Due to the constraint imposed by the output rollers 6, the input gear is prevented from rotating about its own axis X2. Further, since the drive shaft axis X1 is offset from the center axis X2 of the input gear, the input gear 9 is further prevented from rotating about the axis X2. Instead, the input gear 9 translates orbitally about the offset drive shaft rotational axis X1.

In accordance with some embodiments, as illustrated in FIG. 3, a bearing 8 is mounted between the input gear 9 and the eccentric cam surface 35. The bearing 8 is interposed between the input gear 9 and the eccentric cam surface 35 so as to reduce friction between the two surfaces as the eccentric cam surface 35 rotates within the center aperture 25. By reducing friction between the two surfaces, overall efficiency of the single-stage cycloidal gearbox 30 is increased. Further, the bearing 8 is advantageous in providing support for the input gear 9 as mounted. A clamp 7 and an outer race clamp ring 3 may be bolted onto the face of the input gear 9 to secure the bearing in the center aperture 25. An output bearing 13 and an output bearing housing 14 may be provided to support and lend sufficient structural rigidity to the output gear.

Referring back to FIG. 2, in some embodiments, the teeth 34 of the input gear 9 are disposed peripherally about a radial exterior of the input gear 9. The output gear 2 may in turn include a plurality of internal teeth 36 disposed about a radial interior of thereof. As discussed briefly above, when the eccentric cam surface 35 engages the input gear 9, the input gear 9 is translated orbitally. The orbital translation of the input gear 9 causes the plurality of external teeth 34 of the input gear 9 to cycle in and out of mesh with plurality of internal teeth 36 of the output gear 2. The in-and-out meshing of the teeth 34 and 36 during orbital translation of the input gear 9 produces a corresponding rotational motion of the output gear 2 at the second reduced speed. That is, the output gear 2 is driven at the second output speed as a result of the orbital motion of the input gear 9 within the output gear 2. The rotational motion of the output gear 2 is then output to cause rotation of the solar array. For example, in accordance with some embodiments, the positioning actuator having the single-stage cycloidal gearbox may be coupled directly to a first side of a bracket, and a second side of the bracket may be bolted to a boom which supports the solar array. In particular, the face 5 (illustrated in FIGS. 1, 3, and 5) of the output gear 2 may be bolted or otherwise attached to a bracket. The output gear 2 may be attached at a face 5 thereof to the bracket by means of a bolt or other similar attachment means inserted into the apertures 21 (illustrated in FIG. 3). In this manner, rotation of the output gear 2 causes a corresponding rotation of the bracket onto which it is bolted or otherwise attached. The rotating bracket rotates the boom which supports the solar panel, thereby causing rotation of the solar array at the second output speed. Thus, the various embodiments described herein provide a configuration in which the input speed at which an input shaft (e.g., drive shaft 11) can be converted to a significantly lower (in the magnitude of 60 times) speed as generally desired when rotating solar arrays.

Accordingly, the various embodiments described herein are directed to providing a solar array positioning actuator having a high-efficiency single-stage cycloidal gearbox including only one stage of gears, and yet still capable of performing a gear reduction in which the first speed is reduced to the second speed by a factor of at least 60 within a single rotation of the drive shaft. This is contrary to conventional solar array positioning actuators which are only capable of performing gear reductions corresponding to a reduction of speed by a factor of about 30. In order to produce a corresponding speed reduction in the magnitude of a factor of 60 or greater, the conventional solar array actuators generally are equipped with gearboxes having two or more stages of gearing. Alternatively, in order to achieve the speed reduction in the magnitude of a factor of 60 or greater, the conventional actuators are equipped with harmonic drive gearboxes which are less efficient as they traditionally include a flex spline element having external gear teeth which has to continuously flex in order to accommodate and engage with the rotating input element.

Furthermore, in an attempt to achieve gear reductions of similar magnitude, as described herein, conventional solar array positioning actuators employ harmonic drive gearboxes using a capable of using a single gear reduction. However, these conventional harmonic drive gearboxes typically use specialized parts which are custom made and have limited ranges of gear reduction configuration, due to the specialized nature of their parts. Additionally, the conventional harmonic drive gearboxes tend to be less efficient as they traditionally include an outer flex spline element which has to continuously flex in order to accommodate and engage with an inner rotating input element. The aforementioned harmonic drives are less efficient due to the continuous flexing and elastic deformation of the flex spline element. Additionally, the conventional actuators utilizing a harmonic gear drive are generally incapable of being back-driven due to the amount of friction occurring during the continuous flexing and elastic deformation.

The positioning actuator having the single-stage gearbox of the various described herein has a simple configuration with minimal parts as compared to the complex configurations of conventional actuators capable of achieving similar gear reduction ratios. For example, the single-stage gearbox of the present disclosure utilizes simple gears, actuators and bearings which are readily available or easily fabricated, which do not need to be specialized for the intended purpose. Thus, cost of the positioning actuators of the various embodiments described herein are minimized as compared to conventional positioning actuators utilizing harmonic gear drives, as described above, or as compared to conventional actuators utilizing reduction spur geartrains which typically require two or more stages of gears to achieve similar gear reductions.

A reference to an element in the singular is not intended to mean one and only one unless specifically so stated, but rather one or more. For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the figures, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "substantially" and "approximately" may provide an industry-accepted tolerance for their corresponding terms and/or relativity between items. Such an industry-accepted tolerance may range from less than one percent to 20 percent.

Various items may be arranged differently (e.g., arranged in a different order, or partitioned in a different way) all without departing from the scope of the subject technology. In one aspect of the disclosure, the elements illustrated in the accompanying figures may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying figures may present elements of various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public regardless of whether such disclosure is explicitly recited in claims. No element is to be construed under the provisions of 35 U.S.C. § 112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, and Abstract of the disclosure are hereby incorporated into the disclosure and are provided as illustrative examples of the disclosure, not as restrictive descriptions. It is submitted with the understanding that they will not be used to limit the scope or meaning of the disclosure. In addition, in the Detailed Description, it can be seen that the description provides illustrative examples and the various features are grouped together in various embodiments for the purpose of streamlining the disclosure. This method of disclosure is not to be interpreted as reflecting an intention that the disclosed subject matter requires more features than are expressly recited in claims of any application claiming priority hereto.

What is claimed is:

1. An actuator for positioning a solar array to track the sun, the actuator comprising:
   a motor;
   a cycloidal gearbox operatively coupled to the motor, the cycloidal gearbox comprising:
      a drive shaft rotationally coupled to the motor, the drive shaft having an eccentric cam surface, wherein the motor is configured to rotate the drive shaft about a drive axis at a first input speed;
      an input gear, the input gear coupled to and driven by the eccentric cam surface of the drive shaft; and
      an output gear configured to be engaged and driven by the input gear at a second output speed, the output gear defining a plurality of apertures extending through an external face of the output gear,
   wherein the cycloidal gearbox is configured to reduce the first input speed in magnitude to the second output speed by a factor of at least 60 times, within a single rotation of the drive shaft.

2. The actuator of claim 1, wherein the input gear comprises a center aperture having a central axis.

3. The actuator of claim 2 wherein the drive axis is offset from the central axis of the input gear center aperture, and rotation of the drive shaft about the drive axis causes the eccentric cam surface to translate the input gear orbitally about the drive axis.

4. The actuator of claim 2, further comprising a bearing mounted in the center aperture interposing the input gear and the eccentric cam surface for reducing friction between the input gear and the eccentric cam surface.

5. The actuator of claim 4, wherein the input gear further comprises a plurality of drive apertures circumferentially disposed about the center aperture.

6. The actuator of claim 5, further comprising a plurality of output rollers, each mounted within a corresponding aperture of the drive apertures, the output rollers each having an outer diameter smaller than a diameter of the corresponding drive aperture.

7. The actuator of claim 6, further comprising a plurality of roller shafts mounted within a housing of the cycloidal gearbox, each of the roller shafts mounting a corresponding roller of the output rollers at a fixed position within the corresponding aperture to restrain rotation of the input gear about the central axis of the central aperture.

8. The actuator of claim 7, wherein the input gear is disposed within a radial interior of the output gear.

9. The actuator of claim 8, wherein:
the input gear comprises a plurality of external teeth disposed peripherally about a radial exterior thereof;
the output gear comprises a plurality of internal teeth disposed about a radial interior thereof; and
orbital translation of the input gear within the output gear engages the plurality of external teeth of the input gear to cycle in and out of mesh with plurality of internal teeth of the output gear to drive rotation of the output gear at the second speed.

10. The actuator of claim 9, wherein the output gear comprises a number N of the internal teeth, and the input gear comprises a number N−2 of the external teeth.

11. The actuator of claim 1, wherein the output gear comprises a plurality of external teeth for outputting the reduced second speed to the solar array.

12. A cycloidal gearbox, comprising:
a drive shaft having a drive axis and an eccentric cam surface at first end thereof, the drive shaft rotationally coupled at a second end thereof to a motor configured to rotate the drive shaft about the drive axis at a first input speed;
an input gear coupled to the eccentric cam surface and configured to be orbitally translated about the drive axis by the eccentric cam surface; and
an output gear positioned radially exterior to the input gear, the output gear defining a plurality of apertures extending through an external face of the output gear, the output gear configured to be engaged, with and driven by the orbitally translated input gear at a second output speed,
wherein within a single rotation of the drive shaft, the first speed is reduced in magnitude to the second speed by a factor of at least 60 times.

13. The cycloidal gearbox of claim 12, wherein the input gear comprises a center aperture having a central axis, and a plurality of drive apertures circumferentially disposed about the center aperture.

14. The cycloidal gearbox of claim 13 wherein the drive axis is offset from the central axis of the input gear center aperture, and rotation of the drive shaft about the drive axis causes the eccentric cam surface to translate the input gear orbitally about the drive axis.

15. The cycloidal gearbox of claim 13, further comprising a bearing mounted in the center aperture interposing the input gear and the eccentric cam surface for reducing friction between the input gear and the eccentric cam surface.

16. The cycloidal gearbox reducer of claim 13, further comprising a plurality of output rollers, each mounted within a corresponding aperture of the drive apertures, the output rollers each having an outer diameter smaller than a diameter of the corresponding drive aperture.

17. The cycloidal gearbox of claim 16, further comprising a plurality of roller shafts mounted within a housing of the cycloidal gearbox, each of the roller shafts mounting a corresponding roller of the output rollers at a fixed position within the corresponding aperture to restrain rotation of the input gear about the central axis of the central aperture.

18. The cycloidal gearbox of claim 17, wherein:
the input gear comprises a plurality of external teeth disposed peripherally about a radial exterior thereof;
the output gear comprises a plurality of internal teeth disposed about a radial interior thereof; and
the orbital translation of the input gear within the output gear engages the plurality of external teeth of the input gear to cycle in and out of mesh with plurality of internal teeth of the output gear to drive rotation of the output gear at the second speed.

19. The cycloidal gearbox of claim 18, further comprising a bearing mounted in the center aperture interposing the input gear and the eccentric cam surface for reducing friction between the input gear and the eccentric cam surface.

20. The cycloidal gearbox of claim 18, wherein the output gear comprises a number N of the internal teeth, and the input gear comprises a number N−2 of the external teeth.

* * * * *